(12) United States Patent
Yoo et al.

(10) Patent No.: US 12,546,897 B2
(45) Date of Patent: Feb. 10, 2026

(54) DRIVER ASSISTANCE SYSTEM AND OPERATION METHOD THEREOF

(71) Applicant: Electronics and Telecommunications Research Institute, Daejeon (KR)

(72) Inventors: Sungjin Yoo, Daejeon (KR); Hyungju Kim, Daejeon (KR); Byung Jang Jeong, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 1093 days.

(21) Appl. No.: 17/550,666

(22) Filed: Dec. 14, 2021

(65) Prior Publication Data

US 2022/0308233 A1 Sep. 29, 2022

(30) Foreign Application Priority Data

Mar. 24, 2021 (KR) ........................ 10-2021-0038114

(51) Int. Cl.
*G01S 17/931* (2020.01)
*B60W 30/09* (2012.01)
(Continued)

(52) U.S. Cl.
CPC .......... *G01S 17/931* (2020.01); *B60W 30/09* (2013.01); *B60W 30/0956* (2013.01); *G01S 7/41* (2013.01);
(Continued)

(58) Field of Classification Search
CPC .......... G01S 17/931; G01S 7/41; G01S 13/89; G01S 13/931; G01S 17/08; G01S 17/89;
(Continued)

(56) References Cited

U.S. PATENT DOCUMENTS 9,234,964 B2 1/2016 Mheen et al.
9,476,983 B2 10/2016 Zeng
(Continued)

FOREIGN PATENT DOCUMENTS

JP 7-182600 7/1995
JP 2004-239744 8/2004
(Continued)

*Primary Examiner* — Matthew C Bella
*Assistant Examiner* — Nicholas John Helco
(74) *Attorney, Agent, or Firm* — KILE PARK REED & HOUTTEMAN PLLC

(57) ABSTRACT

Disclosed is a driver assistance system including a first processor that receives a radar signal from a radar and detects one or more first objects based on the radar signal, a second processor that receives a camera signal from a camera and detects one or more second objects based on the camera signal, a laser controller that controls a beam generator to radiate the laser beam, a segmentation unit that extracts one or more first segments and one or more second segments corresponding to the one or more second objects, a mapping unit that maps at least one of the first segments and at least one of the second segments, a classification unit that classifies a target object based on an image signal and determines a possibility of collision with the target object, and a vehicle controller that controls a vehicle drive device based on the possibility of collision.

12 Claims, 11 Drawing Sheets

(51) Int. Cl.
*B60W 30/095* (2012.01)
*G01S 7/41* (2006.01)
*G01S 13/89* (2006.01)
*G01S 13/931* (2020.01)
*G01S 17/08* (2006.01)
*G01S 17/89* (2020.01)
*G06T 7/10* (2017.01)
*G06V 10/25* (2022.01)
*G06V 20/58* (2022.01)

(52) U.S. Cl.
CPC ............ *G01S 13/89* (2013.01); *G01S 13/931* (2013.01); *G01S 17/08* (2013.01); *G01S 17/89* (2013.01); *G06T 7/10* (2017.01); *G06V 10/25* (2022.01); *G06V 20/58* (2022.01); *B60W 2554/80* (2020.02); *G06T 2207/20081* (2013.01); *G06T 2207/20132* (2013.01); *G06T 2207/30261* (2013.01)

(58) Field of Classification Search
CPC ...... G01S 7/412; G01S 7/4815; G01S 13/865; G01S 13/867; G01S 17/46; G01S 17/86; G01S 13/04; B60W 30/09; B60W 30/0956; B60W 2554/80; B60W 2050/0005; B60W 2420/403; B60W 2420/408; B60W 2420/60; B60W 40/02; B60W 30/08; B60W 40/10; B60W 40/114; G06T 7/10; G06T 2207/20081; G06T 2207/20132; G06T 2207/30261; G06T 2207/30236; G06T 2207/30252; G06T 2207/30256; G06V 10/25; G06V 20/58; G06V 20/56; G06N 3/08; B60Y 2300/08; H04N 23/57

See application file for complete search history.

(56) References Cited

U.S. PATENT DOCUMENTS

| | | | |
|---|---|---|---|
| 10,086,832 B2 | 10/2018 | Kwon et al. | |
| 11,810,365 B1* | 11/2023 | Crego | G06V 20/58 |
| 2007/0165967 A1 | 7/2007 | Ando et al. | |
| 2012/0081542 A1 | 4/2012 | Suk et al. | |
| 2012/0163671 A1* | 6/2012 | Choi | G06V 20/58 |
| | | | 382/104 |
| 2018/0067487 A1* | 3/2018 | Xu | G05D 1/0278 |
| 2018/0272963 A1* | 9/2018 | Meyhofer | B60W 50/023 |
| 2019/0370568 A1* | 12/2019 | Matsunaga | G01S 7/41 |
| 2020/0242941 A1* | 7/2020 | Kim | B62D 15/0295 |
| 2022/0204029 A1* | 6/2022 | Chen | G01S 17/42 |

FOREIGN PATENT DOCUMENTS

| | | | |
|---|---|---|---|
| JP | 2007-187618 | 7/2007 | |
| KR | 10-1449288 | 10/2014 | |
| KR | 10-2018-0000965 | 1/2018 | |
| KR | 10-2018-0071663 | 6/2018 | |
| KR | 10-2118125 | 6/2020 | |
| KR | 10-2175947 | 11/2020 | |
| WO | WO-9826308 A1 * | 6/1998 | ........... B60R 21/013 |

* cited by examiner

DRIVER ASSISTANCE SYSTEM AND OPERATION METHOD THEREOF

CROSS-REFERENCE TO RELATED APPLICATIONS

This application claims priority under 35 U.S.C. § 119 to Korean Patent Application No. 10-2021-0038114 filed on Mar. 24, 2021, in the Korean Intellectual Property Office, the disclosures of which are incorporated by reference herein in their entireties.

BACKGROUND

Embodiments of the present disclosure described herein relate to a driver assistance system and an operation thereof, and more particularly, relate to a driver assistance system for detecting an object using a radar and a camera and controlling driving of a vehicle and an operation thereof.

Recently, for convenience of a user who uses a vehicle, the vehicle has tended to have various sensors, an electronic device, and the like. Particularly, research has been actively done for a driver assistance system (e.g., an advanced driver assistance system (ADAS) for driving convenience of the user. In addition, autonomous vehicles have been actively developed.

Particularly, an adaptive cruise control (ACC) system, an autonomous emergency braking (AEB) system, and the like among driver assistance systems are applied to the vehicle to reduce driver fatigue at the same time as reducing traffic accidents and enhancing driving safety. Such a driver assistance system may be implemented using various sensors, for example, a light detection and ranging (LiDAR), a camera, and the like. Because the respective sensors have different characteristics, implementing the driver assistance system using different sensors rather than using only one sensor may help enhance driving safety.

SUMMARY

Embodiments of the present disclosure provide a driver assistance system for enhancing the accuracy of detecting an object using a radar and a camera and improving driving stability and a driving method thereof.

According to an embodiment, a driver assistance system may include a first processor configured to receive a radar signal from a radar and detect one or more first objects based on the radar signal to determine whether to generate a laser beam, a second processor configured to receive a camera signal from a camera and detect one or more second objects based on the camera signal to determine whether to generate the laser beam, a laser controller configured to control a beam generator to radiate the laser beam in response to a laser beam generation request signal generated by the first processor or the second processor, a segmentation unit configured to extract one or more first segments corresponding to the one or more first objects and one or more second segments corresponding to the one or more second objects, in response to determination to generate the laser beam from the first processor or the second processor, a mapping unit configured to map at least one of the first segments and at least one of the second segments, a classification unit configured to classify a target object based on an image signal in which the mapping is completed and determine a possibility of collision with the target object, and a vehicle controller configured to control a vehicle drive device based on the possibility of collision.

The first processor may obtain at least one information among signal intensity information, distance information, Doppler information, and azimuth angle information about each of the one or more first objects, may estimates a radar cross section (RCS) value for each of the one or more first objects based on the at least one information. The first processor may continue receiving the radar signal, when the RCS value is less than a reference RCS value, and may estimate a speed of each of the one or more first objects, when the RCS value is greater than or equal to the reference value.

The first processor may generate the laser beam generation request signal, when the speed is less than a reference speed and may provide the vehicle controller with a first control signal for controlling the vehicle drive device based on the at least one information, when the speed is greater than or equal to the reference speed.

The second processor may process the camera signal to determine a type of each of the one or more second objects and may calculate a risk probability of each of the one or more second objects. The second processor may provide the vehicle controller with a second control signal for controlling the vehicle drive device based on the radar signal, when the risk probability is greater than a first reference probability, and may compare the risk probability with a second reference probability, when the risk probability is less than or equal to the first reference probability.

The second processor may generate the laser beam generation request signal, when the risk probability is greater than the second reference probability, and may continue receiving the camera signal, when the risk probability is less than or equal to the second reference probability.

The laser controller may control the beam generator to radiate the laser beam in response to the laser beam generation request signal and may provide the second processor with radiation timing information and pattern information of the laser beam.

The second processor may obtain a camera image after the laser beam is radiated based on the radiation timing information and the pattern information of the laser beam.

The segmentation unit may include a first segmentation unit configured to extract the first segments and select a first selection segment in which an intensity of the radar signal is greater than or equal to a certain magnitude among the first segments and a second segmentation unit configured to extract the second segments and select a second selection segment to which the laser beam is radiated among the second segments.

The first processor may obtain position information of the first selection segment.

The laser controller may receive the position information of the first selection segment and may control the beam generator to radiate the laser beam to the center of the first selection segment.

The mapping unit may perform mapping between the first selection segment and the second selection segment and may generate the image signal for the target object included in the first selection segment and the second selection segment.

The classification device may crop a certain portion including the target object from the image signal, may classify the target object based on a deep learning algorithm, and may determine the possibility of collision with the target object based on classification of the target object, a risk probability of the target object, a distance from the target object, and a relative speed with the target object.

The vehicle controller may control the vehicle drive device such that a vehicle avoids the target object to travel, when the possibility of collision is greater than or equal to a reference value and may control the vehicle drive device such that the vehicle maintains a current driving state, when the possibility of collision is less than the reference value.

According to an embodiment, a driver assistance system may include a processor configured to receive a camera signal from a camera and detect one or more objects based on the camera signal to determine whether to generate a laser beam, a laser controller configured to control a beam generator to radiate the laser beam in response to a laser beam generation request signal generated by the processor, a segmentation unit configured to extract one or more segments corresponding to the one or more objects, in response to determination to generate the laser beam from the processor, and determine a selection segment including the laser beam radiated from the beam generator among the one or more segments, a classification unit configured to classify a target object included in the selection segment and determine a possibility of collision with the target object, and a vehicle controller configured to control a vehicle drive device based on the possibility of collision.

The processor may process the camera signal to determine a type of each of the one or more second objects, may calculate a risk probability of each of the one or more objects to determine an object in which the risk probability is within a reference range among the one or more objects as the target object, and may generate the laser beam generation request signal to radiate the laser beam toward the target object.

The processor may obtain a camera image to which the laser beam is radiated from the camera signal and may obtain information about a distance from the target object from the camera image.

The classification unit may determine the possibility of collision with the target object based on classification of the target object and the distance from the target object.

The beam generator may include a first beam generator and a second beam generator, which generate laser beams of different patterns.

The laser controller may control the first beam generator to radiate a first laser beam toward the target object in response to the laser beam generation request signal and may control the second beam generator to radiate a second laser beam toward the target object in response to the laser beam generation request signal.

The processor may receive distance information and inclined angle information between the first beam generator and the second beam generator from the laser controller and may calculate a first distance from the first beam generator or the second beam generator to a point where the first laser beam and the second laser beam are overlapped, based on the distance information and the angle information.

The processor may determine an order where the first laser beam and the second laser beam are arranged, based on the camera image and may compare the first distance with a second distance based on the order to obtain the information about the distance from the target object. The second distance may be a distance from the first beam generator or the second beam generator to the target object.

According to an embodiment, an operation method of a driver assistance system implemented in a vehicle including a radar and a camera may include detecting one or more first objects based on a radar signal obtained by the radar to obtain information about the one or more first objects, detecting one or more second objects based on a camera signal obtained by the camera to obtain information about the one or more second objects, radiating a laser beam based on the information about the one or more first objects or the information about the one or more second objects, obtaining camera image information after the laser beam is radiated from the camera signal, performing segmentation and mapping for the radar signal and the camera image information, classifying a target object based on an image signal in which the mapping is completed and determining a possibility of collision with the target object, and controlling a vehicle drive device based on the possibility of collision.

The performing of the segmentation and the mapping may include extracting one or more first segments from the radar signal, determining a first selection segment in which an intensity of the radar signal is greater than or equal to a certain magnitude among the one or more first segments, radiating the laser beam to the center of the first selection segment, extracting one or more second segments from the camera signal, determining a second selection segment to which the laser beam is radiated among the one or more second segments, and mapping the first selection segment and the second selection segment.

BRIEF DESCRIPTION OF THE FIGURES

The above and other objects and features of the present disclosure will become apparent by describing in detail embodiments thereof with reference to the accompanying drawings.

DETAILED DESCRIPTION

Hereinafter, embodiments of the present disclosure will be described clearly and in detail to such an extent that those skilled in the art easily carry out the present disclosure. Herein, because the present disclosure is able to be implemented in several different forms, embodiments described below are merely illustrative irrespective of whether it is expressed. In other words, the present disclosure may not to be limited to embodiments disclosed below and may be implemented in various different forms.

Figure 1:
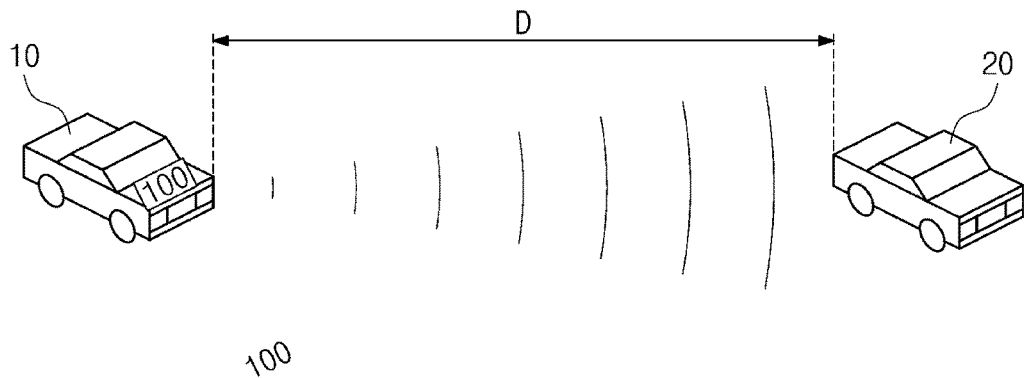
FIG. 1 is a drawing illustrating an embodiment of a driver assistance system.

FIG. 1 is a drawing illustrating an embodiment of a driver assistance system. Referring to FIG. 1, a vehicle 10 may implement a driver assistance system 100.

The driver assistance system 100 may be a concept including an advanced driver assistant system (ADAS). The ADAS may implement at least one of adaptive cruise control (ACC), autonomous emergency braking (AEB), lane keeping assist (LKA), lane change assist (LCA), target following assist (TFA), blind spot detection (BSD), driver status monitoring (DSM), traffic jam assist (TJA).

The ACC may be a driver assistance system of allowing the vehicle 10 to maintain a certain interval with another vehicle 20 located in front of the vehicle 10 by itself without intervention of a driver. To implement it, the vehicle 10 may need several devices. For example, the vehicle 10 may be loaded with a device for measuring a distance D between the vehicle 10 and the other vehicle 20, a device for controlling an engine throttle and a brake based on the measured distance D, a device for displaying related information to the driver, and the like.

The device for measuring the distance D between the vehicle 10 and the other vehicle 20 may include sensors which provide distance information. Such sensors may be a camera, a radar, light detection and ranging (LiDAR), and the like. The camera has high resolution, but it is difficult for the camera to measure a distance or a speed. The radar is able to estimate a distance and a speed and is able to detect an object located in an invisible distance, but has low resolution. The LiDAR is able to measure a distance and a speed and is higher in resolution than the radar, but is expensive and is unable to detect an object located in the invisible distance.

When the ACC uses only one of the camera, the radar, and the LiDAR, it may be difficult to stably recognize a situation in all situations because of vulnerability of each sensor. Due to this, the vehicle 10 may perform an incorrect operation, and human accident may occur. To prevent occurrence of such human accident, the driver assistance system 100 according to the present disclosure may detect an object using one or more sensors, thus enhancing the accuracy of determining a driving situation.

Figure 2:
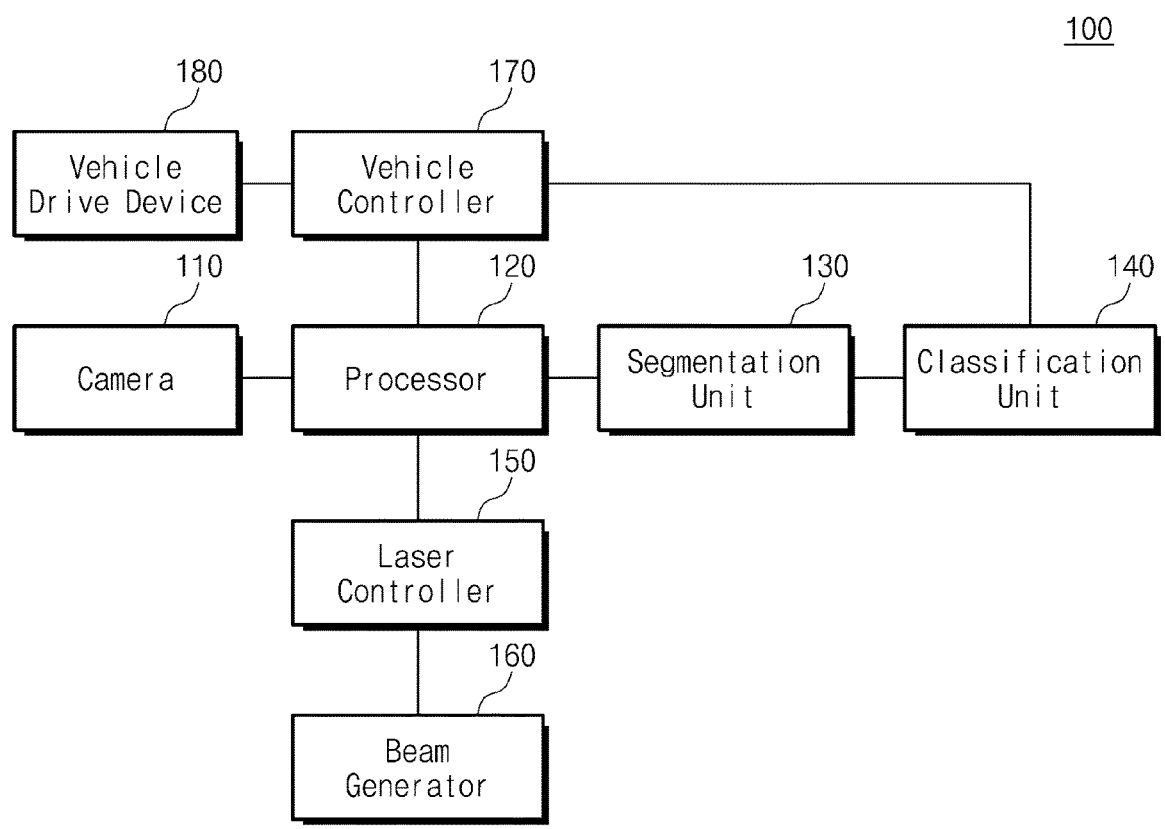
FIG. 2 is a block diagram of a driver assistance system according to an embodiment of the present disclosure.

FIG. 2 is a block diagram of a driver assistance system according to an embodiment of the present disclosure. Referring to FIGS. 1 and 2, a driver assistance system 100 may include a camera 110, a processor 120, a segmentation unit 130, a classification unit 140, a laser controller 150, a beam generator 160, a vehicle controller 170, and a vehicle drive device 180.

The camera 110 may obtain a camera signal including external image information of a vehicle 10. The camera 110 may provide the camera signal to the processor 120. The camera 110 may be at least one of a mono camera, a stereo camera, an around view monitoring (AVM) camera. According to an embodiment, the camera 110 may be included in an object detection device.

The processor 120 may receive a camera signal from the camera 110 and may detect one or more objects based on the camera signal. In this case, the processor 120 may set a region of interest and may process the camera signal to obtain information about objects in the region of interest. For example, the processor 120 may obtain information about a type of an object, information about a distance from the object, and information about a relative speed with the object.

The object may be various objects associated with driving of the vehicle 10. For example the object may include a line, another vehicle, a pedestrian, a two-wheeled vehicle, a traffic signal, light, a road, a structure, a speed bump, topography, an animal, or the like.

The processor 120 may obtain information about a type of an object using an image classification algorithm. For example, the image classification algorithm may include a deep learning algorithm. The processor 120 may determine a type of each of objects detected in the region of interest and may calculate a risk probability for each of the objects.

The risk probability may be a value preset with regard to a type, a size, a weight, or the like of an object, which may be a probability value indicating the degree to which it affects driver's safety upon collision with the vehicle 10. For example, the risk probability may be higher when the object is a vehicle than when the object is a person. For example, the risk probability may be higher when the object is a truck than when the object is a sedan.

The processor 120 may generate a laser beam generation request signal based on the risk probability. When the risk probability is less than a first reference probability and is greater than a second reference probability, the processor 120 may generate the laser beam generation request signal. The first reference probability and the second reference probability may be predetermined reference probabilities. The processor 120 may provide the laser beam generation request signal to the laser controller 150.

The processor 120 may obtain information about a distance from the object based on the camera signal. For example, when the camera 110 is a stereo camera, the processor 120 may obtain information about a distance from the object based on disparity information from the stereo image. According an embodiment, although the camera 110 is a mono camera, the processor 120 may obtain information about a distance from the object by means of the beam generator 160. A detailed description thereof will be given with reference to FIGS. 4 to 5B.

The processor 120 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electrical units for performing other functions.

The segmentation unit 130 may extract one or more segments corresponding to one or more objects from the camera signal. The segmentation unit 130 may select a segment to which the laser beam is radiated from the beam generator 160 among the one or more segments. The segmentation unit 130 may provide the classification unit 140 with information about the segment to which the laser beam is radiated.

The classification unit 140 may determine an object detected from the segment to which the laser beam is radiated as a target object. The classification unit 140 may crop a certain portion including the target object from the segment to which the laser beam is radiated and may classify the target object. In this case, the deep learning algorithm may be used.

The classification unit 140 may determine a possibility of collision with the target object based on classification of the target object, a risk probability of the target object, a distance from the target object, and a relative speed with the target object. The classification unit 140 may generate a control signal for controlling the vehicle 10 based on the possibility of collision. The classification unit 140 may provide the vehicle controller 170 with information about the possibility of collision and the control signal.

The laser controller 150 may control the beam generator 160 in response to the laser beam generation request signal generated by the processor 120. The laser controller 150 may allow the beam generator 160 to generate a laser beam and adjust a radiation angle of the laser beam. The laser controller 150 may provide the processor 120 with radiation timing information and pattern information of the laser beam. The processor 120 may obtain a camera signal including image information after the laser beam is radiated based on the radiation timing information and the pattern information of the laser beam.

The beam generator 160 may generate a laser beam under control of the laser controller 150. The beam generator 160 may include a plurality of beam generators which generate laser beams of different patterns. According to an embodiment, the beam generator 160 may be included in the object detection device.

The vehicle controller 170 may control the vehicle drive device 180 based on the control signal generated by the processor 120 or the classification unit 140. For example, when it is determined that the risk probability for the object detected in the region of interest is greater than the first reference probability and that it is possible to obtain information about a distance from the camera signal, the vehicle controller 170 may receive a control signal from the processor 120. In this case, the control signal may be a signal for controlling the vehicle drive device 180 to avoid the object detected in the region of interest.

For example, the vehicle controller 170 may receive the control signal together with the information about the possibility of collision from the classification unit 140. In this case, the control signal may vary with the possibility of collision. For example, when the possibility of collision is greater than or equal to a reference value, the vehicle controller 170 may control the vehicle drive device 180 such that the vehicle 10 avoids the object to travel. For example, when the possibility of collision is less than the reference value, the vehicle controller 170 may control the vehicle drive device 180 such that the vehicle 10 maintains a current driving state.

According an embodiment, at least one of the segmentation unit 130, the classification unit 140, the laser controller 150, and the vehicle controller 170 may be integrated and implemented into the processor 120. According an embodiment, at least one of the segmentation unit 130, the classification unit 140, the laser controller 150, and the vehicle controller 170 may be implemented as one or more processors different from the processor 120.

The vehicle drive device 180 may be driven by the vehicle controller 170. The vehicle drive device 180 may include a power train drive device, a chassis drive device, a door/window drive device, a safety device drive device, a lamp drive device, and an air conditioning drive device. The power train drive device may include a power source drive device and a transmission drive device. The chassis drive device may include a steering drive device, a brake drive device, and a suspension control device. According an embodiment, the vehicle drive device 180 may be mounted on the vehicle 10 to be independent of the driver assistance system 100.

Figure 3:
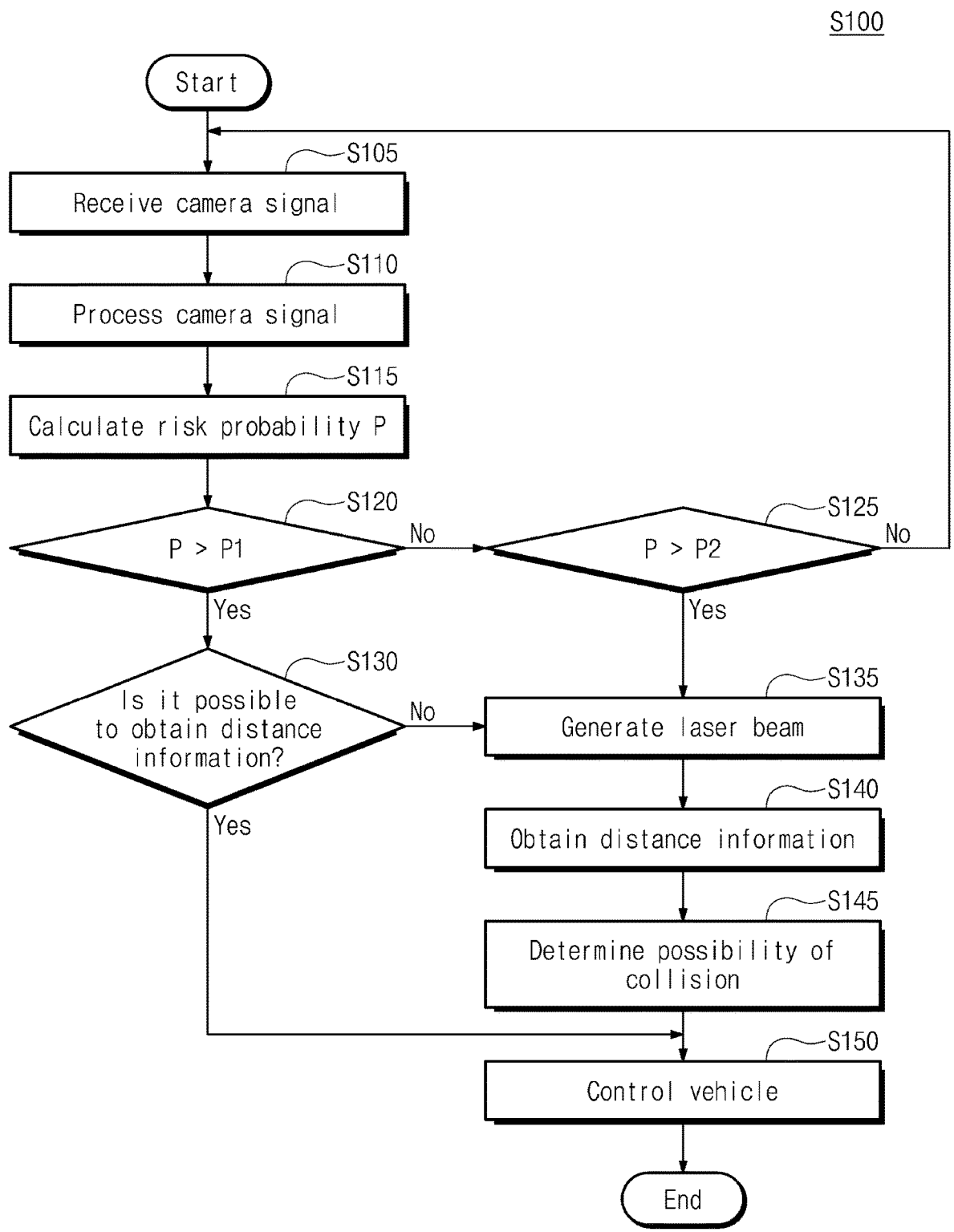
FIG. 3 is a flowchart illustrating an operation method of a driver assistance system of FIG. 2.

FIG. 3 is a flowchart illustrating an operation method of a driver assistance system of FIG. 2. Referring to FIGS. 2 and 3, a driver assistance system 100 may control a vehicle 10 of FIG. 1 based on a camera signal.

In operation S105, the driver assistance system 100 may receive the camera signal. For example, a camera 110 may obtain the camera signal including external image information of the vehicle 10. In operation S110, the driver assistance system 100 may process the camera signal to obtain information about an object. For example, the processor 120 may obtain information about a type of an object, information about a distance from the object, and information about a relative speed with the object, for objects in a region of interest.

In operation S115, the driver assistance system 100 may calculate a risk probability P of each of the objects detected in the region of interest. For example, the processor 120 may classify objects detected in the region of interest based on an image classification algorithm and may calculate a risk probability P according to a type of the object or the like. The driver assistance system 100 may compare the calculated risk probability P with a predetermined first reference probability P1 and a predetermined second reference probability P2.

In operation S120, the driver assistance system 100 may compare the risk probability P with the predetermined first reference probability P1. When the risk probability P is not greater than the first reference probability P1, operation S120 may proceed. When the risk probability P is greater than the first reference probability P1, operation S130 may proceed.

In operation S125, the driver assistance system 100 may compare the risk probability P with the predetermined second reference probability P2. The second reference probability P2 may be a probability value less than the first reference probability P1. When the risk probability P is greater than the second reference probability P2, operation S105 may proceed again. In other words, the driver assistance system 100 may continue receiving the camera signal. When the risk probability P is not greater than the second reference probability P2, operation S135 may proceed.

In operation S130, the driver assistance system 100 may determine whether it is possible to obtain distance information from the camera signal. When it is possible to obtain the distance information from the camera signal, the driver assistance system 100 may generate a control signal for controlling the vehicle 10 immediately without generation of a laser beam. For example, when the camera 110 is a stereo camera, the processor 120 may obtain information about a distance from the object from the camera signal without generation of a laser beam. When it is not possible to obtain the distance information from the camera signal, operation S135 may proceed. For example, when the camera 110 is a mono camera, it may be difficult for the processor 120 to obtain information about a distance from the object from the camera signal without generation of a laser beam.

In operation S135, the driver assistance system 100 may generate a laser beam. For example, a laser controller 150 may receive a laser beam generation request signal from the processor 120 and may control a beam generator 160 in response to the laser beam generation request signal. The beam generator 160 may be composed of a plurality of beam generators including a first beam generator and a second beam generator. The beam generator 160 may radiate laser beams of different patterns under control of the laser controller 150.

In operation S140, the driver assistance system 100 may obtain information about a distance from the object by means of generation of the laser beam, even when the camera 110 is a mono camera. For example, the processor 120 may calculate a first distance from the first beam generator or the second beam generator to a point where the first laser beam and the second laser beam are overlapped with each other, based on distance information and inclined angle information of the first beam generator and the second beam generator. Furthermore, the processor 120 may obtain information about a second distance from the first beam generator or the second beam generator to the object, based on an order where the first laser beam and the second laser beam are arranged in the camera signal.

According an embodiment, the driver assistance system 100 may allow the beam generator 160 to generate a laser beam having various patterns using a micro-electro-mechanical systems (MEMS) mirror. In this case, the driver assistance system 100 may estimate a distance using a change in pattern size.

In operation S145, the driver assistance system 100 may determine a possibility of collision with a target object. The target object may be an object detected from a segment to which the laser beam is radiated. For example, the classification unit 140 may determine a possibility of collision with the target object based on classification of the target object, a risk probability of the target object, a distance from the target object, and a relative speed with the target object.

In operation S150, the driver assistance system 100 may control driving of the vehicle 10 based on the control signal. For example, the vehicle controller 170 may control the vehicle drive device 180 based on a control signal directly received from the processor 120 or a control signal received together with information about the possibility of collision from the classification unit 140.

Figure 4:
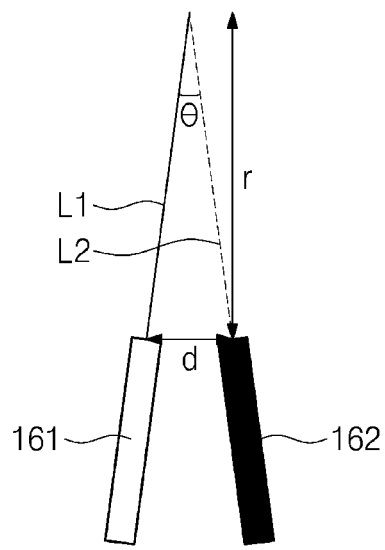
FIGS. 4, 5A, and 5B are drawings illustrating a method for obtaining distance information in a driver assistance system of FIG. 2.
Figure 5A:
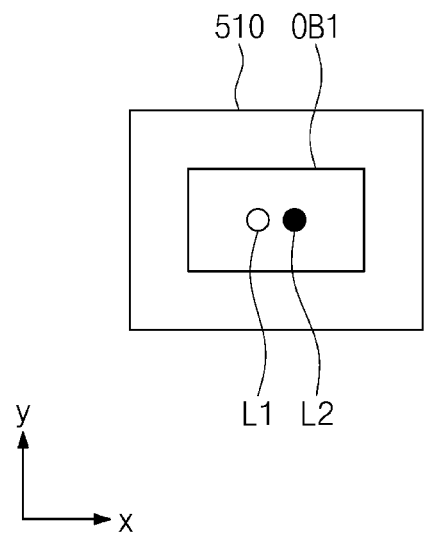
Figure 5B:
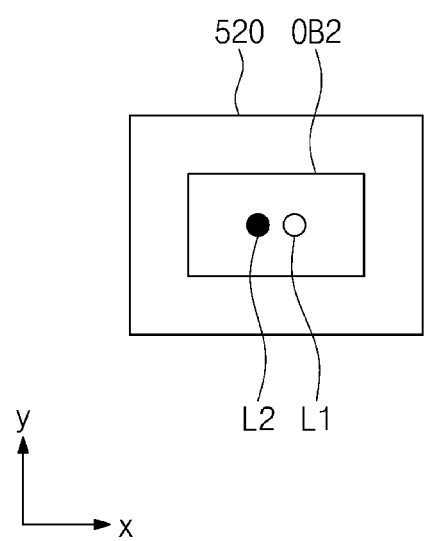

FIGS. 4 to 5B are drawings illustrating a method for obtaining distance information in a driver assistance system of FIG. 2. FIG. 4 illustrates a first beam generator 161 and a second beam generator 162, which generate laser beams of different patterns. FIGS. 5A and 5B illustrate an example of a camera image on which laser beams of different patterns are displayed.

Referring to FIGS. 2 and 4, a driver assistance system 100 may include the first beam generator 161 and the second beam generator 162. The first beam generator 161 may radiate a first laser beam L1 of a first pattern to an object. The second beam generator 162 may radiate a second laser beam L2 of a second pattern to the object. The first laser beam L1 may differ in wavelength from the second laser beam L2.

The first beam generator 161 and the second beam generator 162 may radiate the first laser beam L1 and the second laser beam L2 under control of a laser controller 150. The laser controller 150 may control the first beam generator 161 and the second beam generator 162 to radiate the first laser beam L1 and the second laser beam L2 toward the center of an object detected by the processor 120.

At this time, the laser controller 150 may obtain radiation timing information of the first laser beam L1 and the second laser beam L2. Furthermore, the laser controller 150 may obtain pattern information of the first laser beam L1 and the second laser beam L2 based on characteristics of the first beam generator 161 and the second beam generator 162. The driver assistance system 100 may obtain a camera signal after laser beams are radiated based on the radiation timing information and the pattern information of the first laser beam L1 and the second laser beam L2.

The driver assistance system 100 may obtain distance information and inclined angle information between the first beam generator 161 and the second beam generator 162. A distance d and an inclined angle θ between the first beam generator 161 and the second beam generator 162 may be values determined when the first beam generator 161 and the second beam generator 162 are mounted on a vehicle 10 of FIG. 1. The distance d between the first beam generator 161 and the second beam generator 162 may be a distance according to a first direction between a point where the first laser L1 is radiated from the first beam generator 161 and a point where the second laser beam L2 is radiated from the second beam generator 162. The first direction may be a horizontal direction x in FIG. 4, which may be a direction of the full width of the vehicle 10.

The driver assistance system 100 may calculate a distance r from the first beam generator 161 or the second beam generator 162 to a point where the first laser beam L1 and the second laser beam L2 are overlapped with each other, based on the distance d and the inclined angle θ between the first beam generator 161 and the second beam generator 162. The distance r from the first beam generator 161 to the overlapped point may be a distance according to a second direction between the point where the first laser beam L1 is radiated from the first beam generator 161 and the overlapped point. The second direction may be a vertical direction y in FIG. 4, which may be a direction of the overall length of the vehicle 10. The distance from the second beam generator 162 to the overlapped point may be the same as the distance r from the first beam generator 161 to the overlapped point.

The driver assistance system 100 may determine an order where the first laser beam L1 and the second laser beam L2 are arranged from the camera signal. The driver assistance system 100 may generate information about a distance to the object based on the order where the first laser beam L1 and the second laser beam L2 are arranged.

Referring to FIGS. 4 and 5B, the driver assistance system 100 may obtain a first camera image 510 and a second camera image 520 from the camera signal. The first camera image 510 may include an object OB1, a first laser beam L1, and a second laser beam L2. The first laser beam L1 and the second laser beam L2 may be arranged in order along the first direction on the first camera image 510. This may mean that the distance from the first beam generator 161 to the object OB1 is shorter than the distance r from the first beam generator 161 to the overlapped point.

The second camera image 520 may include an object OB2, a first laser beam L1, and a second laser beam L2. The first laser beam L1 and the second laser beam L2 may be arranged in in reverse order along the first direction on the second camera image 520. This may mean that the distance from the first beam generator 161 to the object OB1 is longer than the distance r from the first beam generator 161 to the overlapped point.

Figure 6:
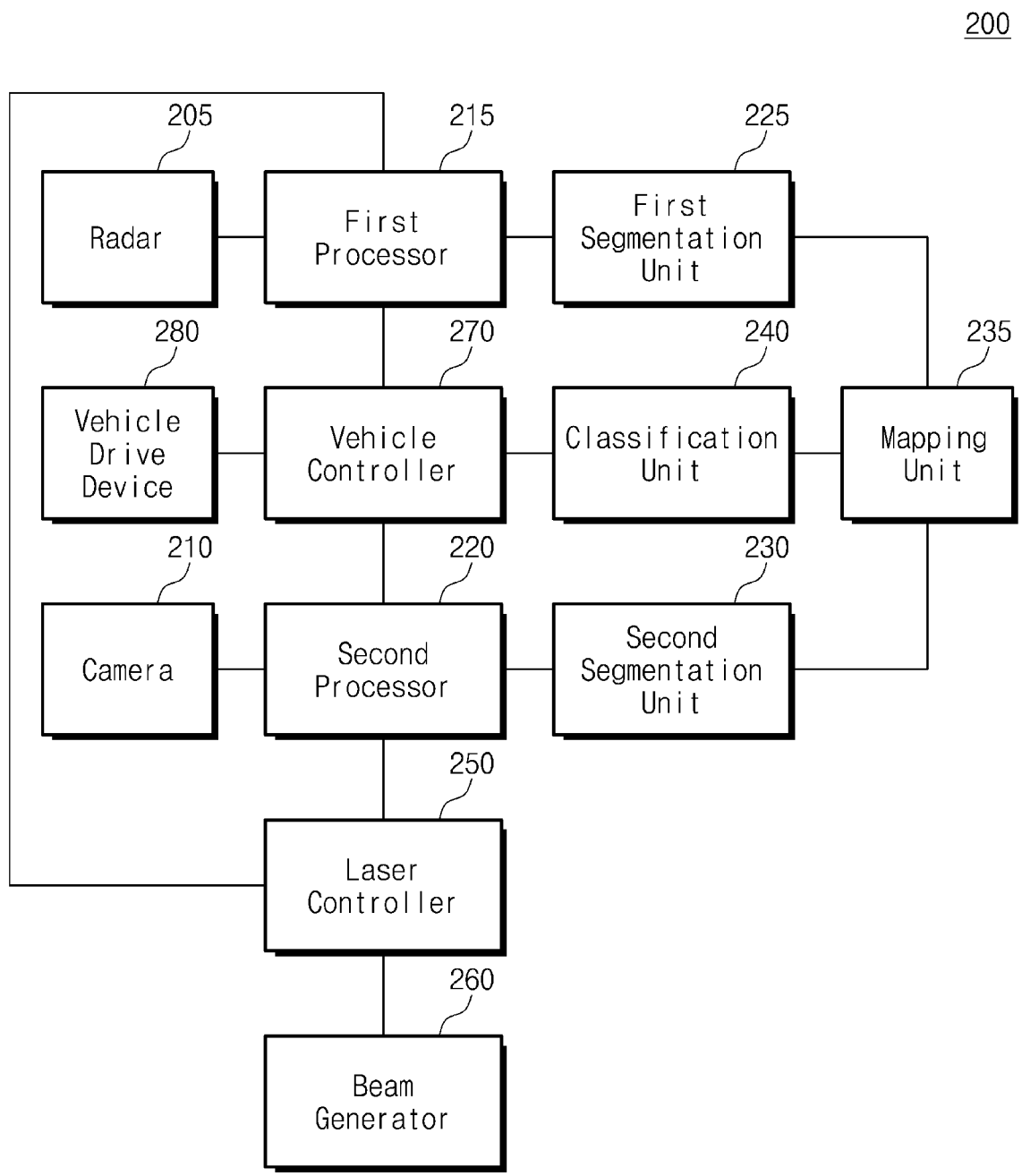
FIG. 6 is a block diagram of a driver assistance system according to an embodiment of the present disclosure.

FIG. 6 is a block diagram of a driver assistance system according to an embodiment of the present disclosure. Referring to FIGS. 1, 2, and 6, a driver assistance system 200 may include a radar 205, a camera 210, a first processor 215, a second processor 220, a first segmentation unit 225, a second segmentation unit 230, a mapping unit 235, a classification unit 240, a laser controller 250, a beam generator 260, a vehicle controller 270, and a vehicle drive device 280.

According an embodiment, the driver assistance system 200 may be implemented in a vehicle 10 rather than a driver assistance system 100. Because the camera 210, the second processor 220, the second segmentation unit 230, the classification unit 240, the laser controller 250, the beam generator 260, the vehicle controller 270, and the vehicle drive device 280 of FIG. 6 are similar to a camera 110, a processor 120, a segmentation unit 130, a classification unit 140, a laser controller 150, a beam generator 160, a vehicle controller 170, and a vehicle drive device 180 of FIG. 2, a detailed description thereof will be omitted.

The radar 205 may obtain a radar signal including information about an object outside the vehicle 10 using a radio wave. The radar 205 may provide the radar signal to the first processor 215. The radar 205 may operate based on a time of flight (TOF) scheme or a phase-shift scheme through electromagnetic waves. For example, the radar 205 may include a beamforming radar or a multiple-input multiple-output (MIMO) radar. According to an embodiment, the radar 205 may be included in an object detection device.

The camera 210 may obtain a camera signal including external image information of the vehicle 10.

The first processor 215 may receive the radar signal from the radar 205 and may detect one or more first objects based on the radar signal. In this case, the first processor 215 may set a region of interest and may process the radar signal to obtain information about the first objects in the region of interest. For example, the first processor 215 may obtain at least one of signal intensity information, distance information, Doppler information, and azimuth angle information about each of the first objects.

The first processor 215 may estimate a radar cross section (RCS) value for each of the first objects based on the information about the first objects in the region of interest. When the RCS value is less than a reference RCS value, the first processor 215 may continue receiving the radar signal. When the RCS value is greater than or equal to the reference RCS value, the first processor 215 may estimate a speed of each of the first objects.

When the estimated speed is less than a reference speed, the first processor 215 may generate a laser beam generation request signal. When the estimated speed is greater than or equal to the reference speed, the first processor 215 may generate a control signal for controlling the vehicle drive device 280. The first processor 215 may directly provide the control signal to the vehicle controller 270.

The first processor 215 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electrical units for performing other functions.

The second processor 220 may receive a camera signal from the camera 210 and may detect one or more second objects based on the camera signal. The second processor 220 may process the camera signal to obtain information about the second objects. The second processor 220 may determine whether to generate a laser beam based on the information about the second objects.

The second processor 220 may determine a type of each of one or more objects based on the camera signal and may calculate a risk probability of each of the second objects. When the risk probability is less than a first reference probability and is greater than a second reference probability, the second processor 220 may generate the laser beam generation request signal.

The first segmentation unit 225 may extract one or more segments corresponding to the one or more first objects from the radar signal. The first segmentation unit 225 may select a segment having a signal intensity of a certain level or more among the first segments.

The first segmentation unit 225 may provide the selected segment information to the first processor 215 and the mapping unit 235. The first processor 215 may generate the laser beam generation request signal to radiate a laser beam to the center of the segment selected based on the selected segment information.

The second segmentation unit 230 may extract one or more second segments corresponding to the one or more second objects from the camera signal. The second segmentation unit 230 may select a segment to which the laser beam is radiated among the second segments. The second segmentation unit 230 may provide the classification unit 240 with information about the segment to which the laser beam is radiated.

The mapping unit 235 may map at least one of the first segments extracted from the radar signal and at least one of the second segments extracted from a camera image without the laser beam or a camera image with the laser beam. For example, the mapping unit 235 may perform mapping between a segment having a signal intensity of a certain level or more among the first segments and a segment to which the laser beam is radiated among the second segments.

Radar image information included in the radar signal and camera image information included in the camera signal may include different image information. For example, the radar image information may have information about a bird's eye view, and the camera image information may have information about a front view of the vehicle 10. In other words, one object may be represented in different forms in each image. Thus, the mapping unit 235 may perform mapping between segments such that the radar image information and the camera image information represent one object. The mapping unit 235 may generate an image signal in which the mapping between the segments is completed and may provide the classification unit 240 with the image signal.

The classification unit 240 may determine a third object, determined from the image signal in which the mapping between the segments is completed, as a target object. The classification unit 240 may crop a certain portion including the target object from the image signal in which the mapping between the segments is completed and may classify the target object. In this case, the deep learning algorithm may be used.

The classification unit 240 may determine a possibility of collision with the target object based on classification of the target object, a risk probability of the target object, a distance from the target object, and a relative speed with the target object. The classification unit 240 may provide the vehicle controller 270 with information about the possibility of collision.

The laser controller 250 may control the beam generator 260 in response to the laser beam generation request signal generated by the first processor 215 or the second processor 220. The laser controller 250 may control a radiation direction of the beam generator 260 to enhance accuracy of mapping. A detailed description thereof will be described with reference to FIG. 11. The beam generator 260 may generate a laser beam in the radiation direction controlled by the laser controller 250.

The vehicle controller 270 may control the vehicle drive device 280 based on the control signal generated by the first processor 215, the second processor 220, or the classification unit 240. For example, when the first processor 215 determines that the RCS value is greater than a reference RCS value and that the estimated speed of the first object is greater than a reference speed, the vehicle controller 270 may receive a control signal from the first processor 215. In this case, the control signal may be a signal for controlling the vehicle drive device 280 to avoid the first object detected in the region of interest. The vehicle drive device 280 may be driven by the vehicle controller 270.

According an embodiment, at least one of the first segmentation unit 225, the second segmentation unit 230, the mapping unit 235, the classification unit 240, the laser controller 250, the beam generator 260, and the vehicle controller 270 may be integrated and implemented into the first processor 215 or the second processor 220. According an embodiment, at least one of the first segmentation unit 225, the second segmentation unit 230, the mapping unit 235, the classification unit 240, the laser controller 250, the beam generator 260, and the vehicle controller 270 may be implemented as one or more processors different from the first processor 215 and the second processor 220.

Figure 7A:
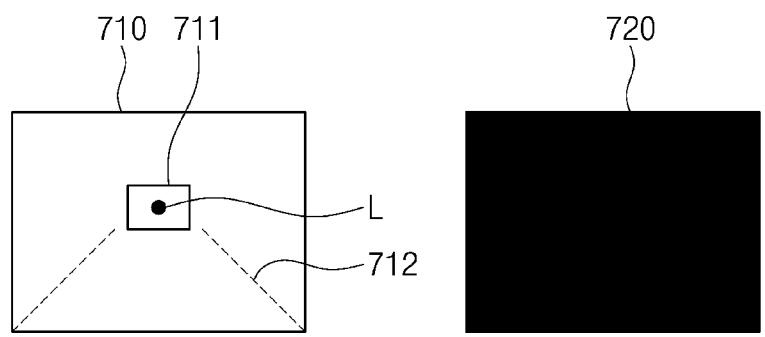
FIGS. 7A and 7B are drawings illustrating validity of a driver assistance system of FIG. 6.
Figure 7B:
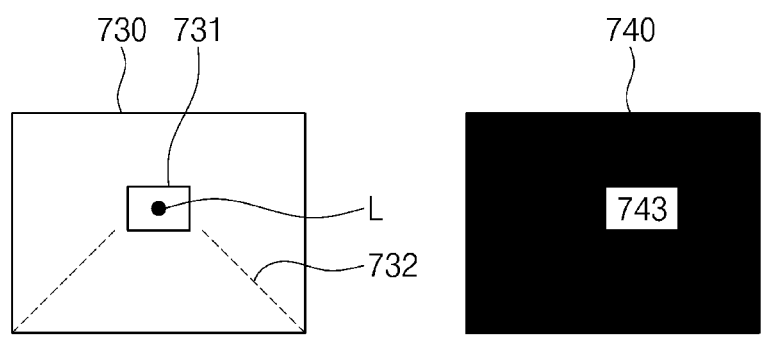

FIGS. 7A and 7B are drawings illustrating validity of a driver assistance system of FIG. 6. FIG. 7A illustrates a camera signal and a radar signal when a first object 711 is in a driving direction of a vehicle 10. FIG. 7B illustrates a camera signal and a radar signal when a third object 731 is in a driving direction of a vehicle 10.

Referring to FIGS. 6 to 7B, a driver assistance system 200 may obtain a first camera image 710 and a second camera image 730 from the camera signal and may obtain a first radar image 720 and a second radar image 740 from a radar signal. The first camera image 710 and the second camera image 730 may be obtained from the camera signal after a laser beam L is radiated.

The first camera image 710 may include a first object 711, a second object 712, and a laser beam L. The first object 711 and the second object 712 may be detected from the first camera image 710, but may fail to be detected from the first radar image 720. For example, the first object 711 may be an empty box, and the second object 712 may be a line.

The second camera image 730 may include a third object 731, a fourth object 732, and a laser beam L. The third object 731 and the fourth object 732 may be detected from the second camera image 730. The third object 731 may be detected as a fifth object 743 from the second radar image 740. For example, the third object 731 or the fifth object 743 may be a box in which a specific material is stored, and the fourth object 732 may be a line.

When comparing the first camera image 710 with the second camera image 730, it may be difficult to distinguish the first object 711 from the third object 731. In other words, when the driver assistance system 200 controls driving of the vehicle 10 using only the camera signal, an error may occur in situation determination by the third object 711 and the third object 731.

On the other hand, when comparing the first radar image 720 with the second radar image 740, the fifth object 743 corresponding to the third object 731 may be detected in only the second radar image 740. In other words, the driver assistance system 200 may compare the first radar image 720 with the second radar image 740 to distinguish the first object 711 from the third object 731. The third object 731 or the fifth object 743 may reflect a radar signal. The driver assistance system 200 may receive the reflected radar signal to detect the fifth object 743 corresponding to the third object 731.

In other words, the driver assistance system 200 may detect an object by using the camera signal and the radar signal together, the driver assistance system 200 may perform accurate situation determination for the first object 711 and the third object 731. Thus, the driver assistance system 200 may improve driving stability of the vehicle 10.

Figure 8:
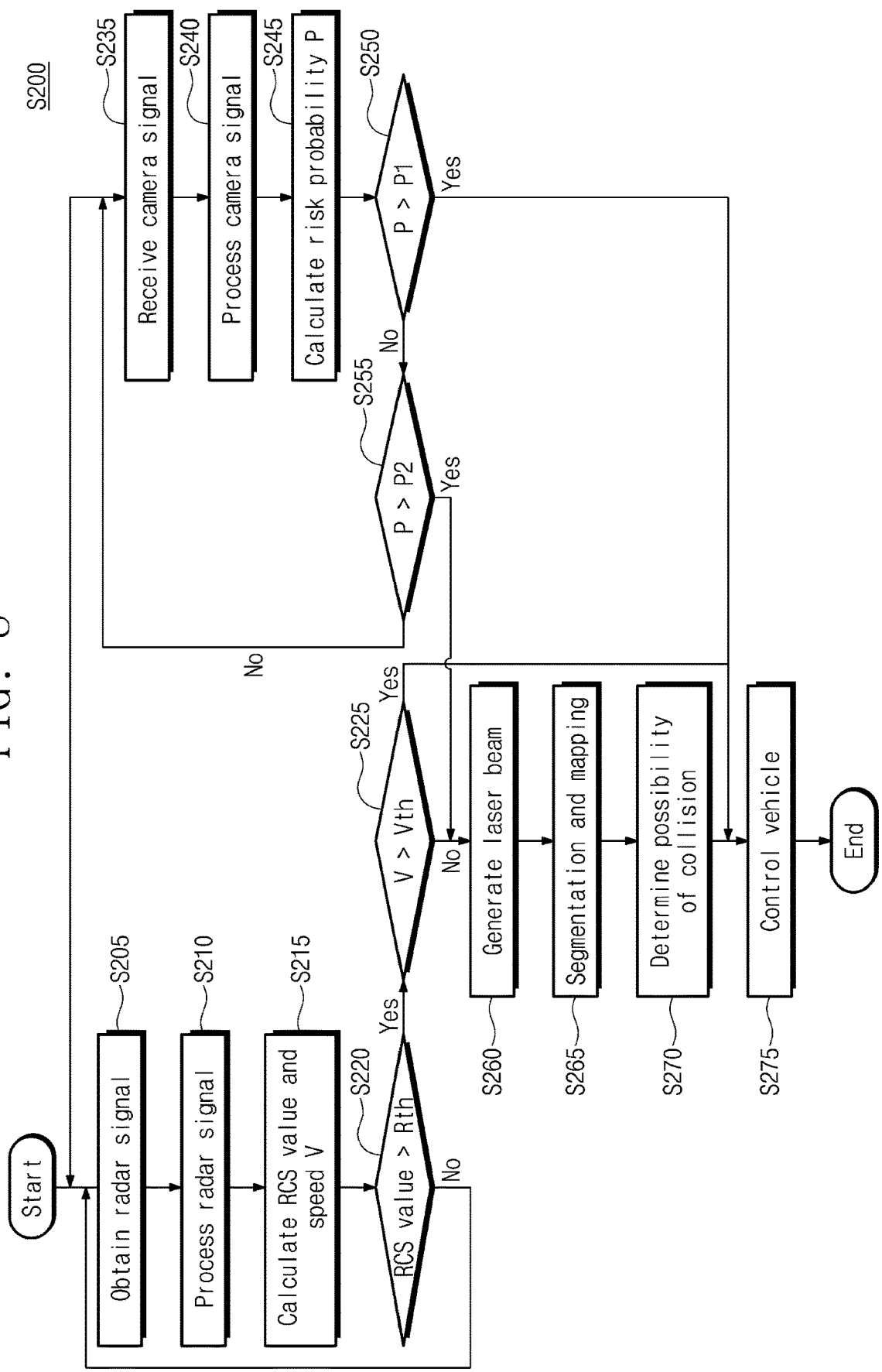
FIG. 8 is a flowchart illustrating an operation method of a driver assistance system of FIG. 6.

FIG. 8 is a flowchart illustrating an operation method of a driver assistance system of FIG. 6. Referring to FIGS. 3, 6, and 8, a driver assistance system 200 may control a vehicle 10 of FIG. 1 based on a radar signal and a camera signal.

In operation S205, the driver assistance system 200 may receive the radar signal. For example, a radar 205 may detect first objects outside the vehicle 10 and may obtain a radar signal including information about the first objects. In operation S210, the driver assistance system 200 may process the radar signal to obtain information about the first objects. For example, a first processor 215 may obtain at least one of signal intensity information, distance information, Doppler information, and azimuth angle information about the first objects in a region of interest.

In operation S215, the driver assistance system 200 may estimate a radar cross section (RCS) value for each of the first objects and a speed V of each of the first objects based on the information about the first objects in the region of interest. The driver assistance system 200 may compare the RCS value and the speed V with a reference RCS value Rth and a reference speed Vth.

In operation S220, the driver assistance system 200 may compare the RCS value with the reference RCS value Rth. When the RCS value is not greater than the reference RCS value Rth, operation S205 may proceed again. In other words, the driver assistance system 200 may continue receiving the radar signal. When the RCS value is greater than the reference RCS value Rth, operation S225 may proceed.

In operation S225, the driver assistance system 200 may compare the speed V of each of the first objects with the reference speed Vth. When the speed V is not greater than the reference speed Vth, operation S260 may proceed. When the speed V is greater than the reference speed Vth, the driver assistance system 200 may generate a control signal for controlling the vehicle 10. For example, the first processor 215 may directly provide the control signal to the vehicle controller 270.

Operations S235, S240, S245, S250, S255, and S260 are similar to operations S105, S110, S115, S120, S125, and S135, a detailed description thereof will be omitted.

In operation S235, the driver assistance system 200 may receive the camera signal. In operation S240, the driver assistance system 200 may process the camera signal to obtain information about second objects. In operation S245, the driver assistance system 200 may calculate a risk probability P of each of the second objects detected in the region of interest. In operation S250, the driver assistance system 200 may compare the risk probability P with a predetermined first reference probability P1. When the risk probability P is not greater than the first reference probability P1, operation S255 may proceed. When the risk probability P is greater than the first reference probability P1, the driver assistance system 200 may generate a control signal for controlling the vehicle 10 based on the camera signal and the radar signal. Because it is possible to obtain distance information from the radar signal, the driver assistance system 200 may directly control the vehicle 10 in an emergency situation where the risk probability P is greater than the first reference probability P1.

In operation S255, the driver assistance system 200 may compare the risk probability P with a predetermined second reference probability P2. When the risk probability P is greater than the second reference probability P2, operation S235 may proceed again. When the risk probability P is not greater than the second reference probability P2, operation S260 may proceed. In operation S260, the driver assistance system 200 may generate a laser beam. For example, the laser controller 250 may receive a laser beam generation request signal from the first processor 215 or the second processor 220 and may control the beam generator 260 in response to the laser beam generation request signal. The beam generator 260 may be composed of a plurality of beam generators including a first beam generator and a second beam generator. The beam generator 260 may radiate laser beams of different patterns under control of the laser controller 250.

In operation S265, the driver assistance system 200 may segment the radar signal and the camera signal and may perform mapping between segments. The driver assistance system 200 may extract one or more first segments corresponding to one or more first objects from the radar signal and may extract one or more second segments corresponding to one or more second objects from the camera signal. The driver assistance system 200 may perform mapping between segments for a segment selected among the first segments and a segment selected among the second segments. A detailed description thereof will be described with reference to FIG. 10.

In operation S270, the driver assistance system 200 may determine a possibility of collision with a target object. The target object may be an object detected from the image signal in which the mapping between the segments is completed. For example, the classification unit 240 may determine a possibility of collision with the target object based on classification of the target object, a risk probability of the target object, a distance from the target object, and a relative speed with the target object.

In operation S275, the driver assistance system 200 may control driving of the vehicle 10 based on the control signal. For example, the vehicle controller 270 may control the vehicle drive device 280 based on a control signal directly received from the first processor 215 or the second processor 220 or a control signal received together with information about the possibility of collision from the classification unit 240.

Figure 9A:
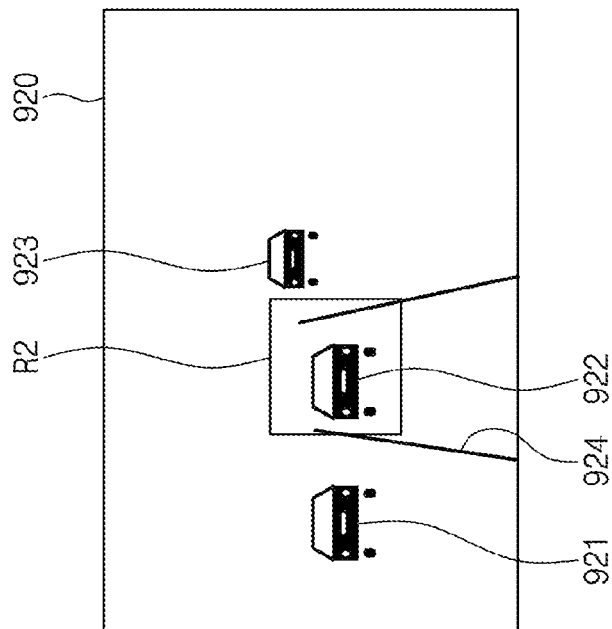
FIGS. 9A and 9B are drawings illustrating an embodiment using a driver assistance system of FIG. 6.
Figure 9A:
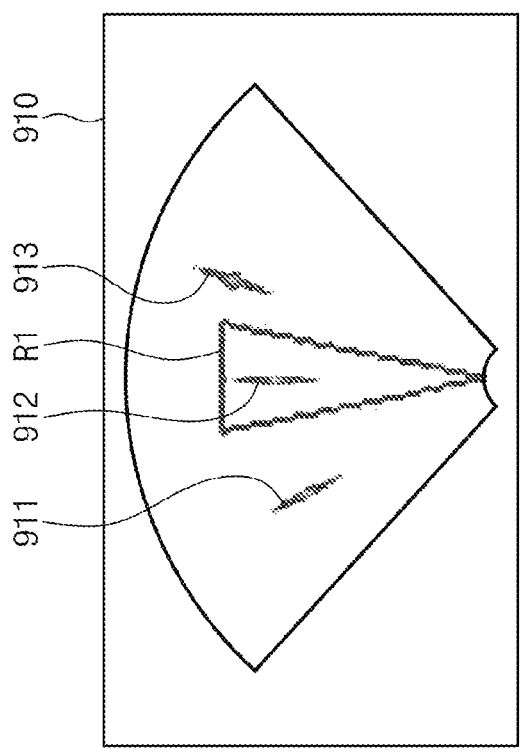
Figure 9B:
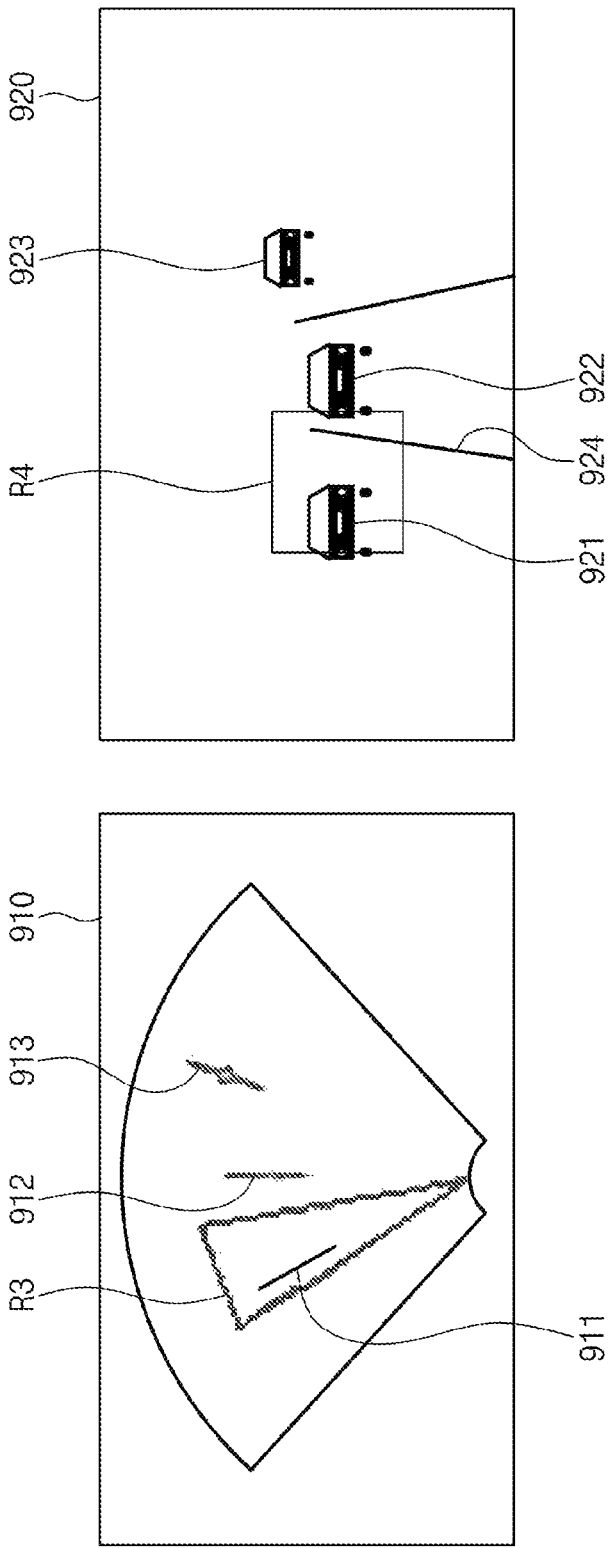

FIGS. 9A and 9B are drawings illustrating an embodiment using a driver assistance system of FIG. 6. FIG. 9A illustrates regions of interest R1 and R2 in a first situation. FIG. 9B illustrates regions of interest R3 and R4 in a second situation.

Referring to FIGS. 6 and 9A, a driver assistance system 200 may obtain a first radar image 910 and a first camera image 920. The first radar image 910 may be obtained from a radar, such as a MIMO radar or a beamforming radar, which is capable of obtaining azimuth angle information. The driver assistance system 200 may detect a first object 911, a second object 912, and a third object 913 from the first radar image 910. The driver assistance system 200 may detect a fourth object 921, a fifth object 922, a sixth object 923, and a seventh object 924 from the first camera image 920.

The driver assistance system 200 may set the region of interest R1 and the region of interest R2 in the first situation. For example, the first situation may be a situation where the vehicle 10 moves forward a lane where a vehicle 10 is currently traveling. In this case, the first region of interest R1 may be set to a triangle in front of the vehicle 10 with respect to a traveling direction of the vehicle 10. The first region of interest R1 may be set based on the stored azimuth angle. The second region of interest R2 may be set to a quadrangle in front of the vehicle 10 with respect to a traveling direction of the vehicle 10. The second region of interest R2 may be set based on the stored coordinates. For convenience of description, the shapes of the first region of interest R1 and the second region of interest R2 are specified, but the shapes of the first region of interest R1 and the second region of interest R2 are not limited thereto. For example, each of the first region of interest R1 and the second region of interest R2 may be a circle.

The driver assistance system 200 may detect an object in the first region of interest R1 or the second region of interest R2. For example, the driver assistance system 200 may detect a second object 912 in the first region of interest R1. Alternatively, the driver assistance system 200 may detect a fifth object 922 in the second region of interest R2. The driver assistance system 200 may obtain information about the second object 912 and the fifth object 922 with respect to the region of interest.

Referring to FIGS. 6 to 9B, the driver assistance system 200 may set the third region of interest R3 and the fourth region of interest R4 in the second situation. For example, the second situation may be a situation where the vehicle 10 moves from a lane where the vehicle 10 is currently traveling to a left lane. The driver assistance system 200 may determine that the vehicle 10 enters the second situation when the driver turns on a left head lamp or moves the steering wheel to the left. In this case, the third region of interest R3 may be set to a triangle at a left side of the vehicle 10 with respect to a traveling direction of the vehicle 10. The third region of interest R3 may be set based on the stored azimuth angle. The fourth region of interest R4 may be set to a quadrangle at a left side of the vehicle 10 with respect to a traveling direction of the vehicle 10. The fourth region of interest R4 may be set based on the stored coordinates.

In other words, while the first situation changes to the second situation, the driver assistance system 200 may change the first region of interest R1 and the second region of interest R2 to the third region of interest R3 and the fourth region of interest R4. The driver assistance system 200 may detect an object in the third region of interest R3 or the fourth region of interest R4. For example, the driver assistance system 200 may detect a first object 911 in the third region of interest R3. Alternatively, the driver assistance system 200 may detect a fourth object 921 in the fourth region of interest R4. The driver assistance system 200 may obtain information about the first object 911 and the fourth object 921 with respect to the region of interest.

Figure 10:
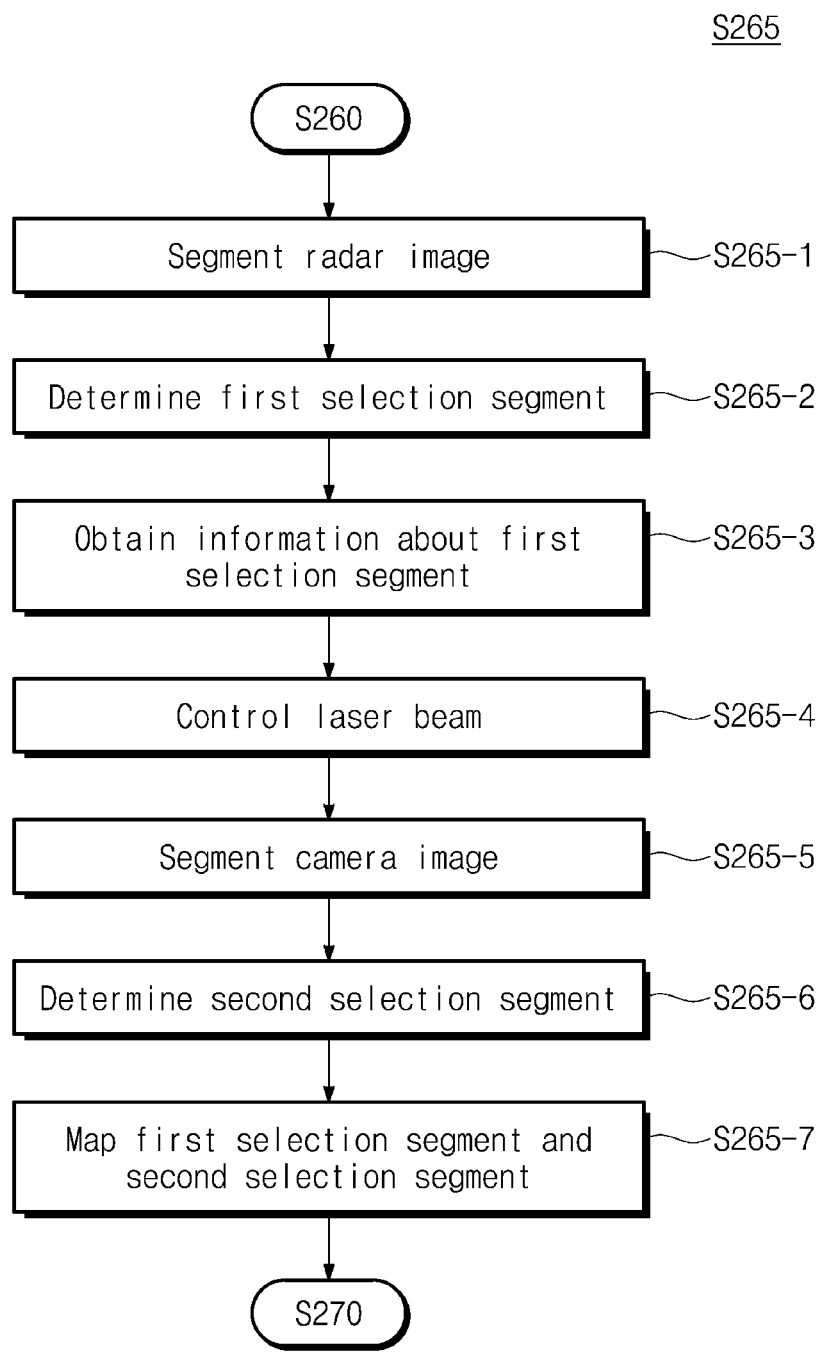
FIG. 10 is a flowchart illustrating in detail operation S265 of FIG. 8.

FIG. 10 is a flowchart illustrating in detail operation S265 of FIG. 8. Referring to FIGS. 6, 8, and 10, a driver assistance system 200 may perform segmentation for a radar signal and a camera signal and may perform mapping between segments.

The driver assistance system 200 may obtain a radar image, a camera image before radiating a laser beam, and a camera image after radiating the laser beam, based on the radar signal, the camera signal, and radiation timing information and pattern information of the laser beam. The driver assistance system 200 may perform segmentation and mapping for at least two or more of the radar image, the camera image before radiating the laser beam, and the camera image after radiating the laser beam. For convenience of description, a description will be given below of a segmentation and mapping process for the radar image and the camera image after radiating the laser beam.

In operation S265-1, the driver assistance system 200 may perform segmentation for the radar image. For example, a first segmentation unit 225 may extract one or more first segments corresponding to one or more first objects from the radar signal. In other words, the first segments may include the first objects, respectively.

In operation S265-2, the driver assistance system 200 may select a segment having a signal intensity of a certain level or more among the first segments. Each of the first segments may include intensity information of the radar signal reflected from each of the first objects. For example, the first segmentation unit 225 may determine a segment having a signal intensity of a certain level or more as a first selection segment based on the intensity information of the reflected radar signal.

In operation S265-3, the driver assistance system 200 may obtain information about the first selection segment. The information about the first selection segment may include position information, angle information, coordinate information, or the like of the first selection segment. For example, a first processor 215 may obtain the position information of the first selection segment and may provide a laser controller 250 with a laser beam generation request signal together with the position information of the first selection segment.

In operation S265-4, the driver assistance system 200 may generate a laser beam based on the laser beam generation request signal. The driver assistance system 200 may radiate the laser beam to the first selection segment based on the position information of the first selection segment. For example, the laser controller 250 may control a beam generator 260 to radiate the laser beam to the center of the first selection segment.

In operation S265-5, the driver assistance system 200 may perform segmentation for the camera image. For example, a second segmentation unit 230 may extract one or more second segments corresponding to one or more second objects from the camera signal. In other words, the second segments may include the second objects, respectively.

In operation S265-6, the driver assistance system 200 may select a segment including the laser beam among the second segments. Because the camera image is an image after the laser beam is radiated, the laser beam may be displayed on any one of the second segments. For example, the second segmentation unit 230 may determine a segment to which the laser beam is radiated as a second selection segment. Because the laser beam is radiated to the first selection segment in operation S265-4, the second selection segment may include an object common to the first selection segment. Herein, the object common to the first segment may be referred to as a target object.

In operation S265-7, the driver assistance system 200 may map the first selection segment and the second selection segment. Because pieces of information obtained from the radar signal and the camera signal are different from each other, the driver assistance system 200 may map the first selection segment extracted from the radar signal and the second segment extracted from the camera signal to obtain accurate information about the target object.

According an embodiment, when the plurality of first selection segments are determined in operation S265-2, the driver assistance system 200 may perform operations S265-3 to S265-7 for each of the plurality of first selection segments.

Figure 11:
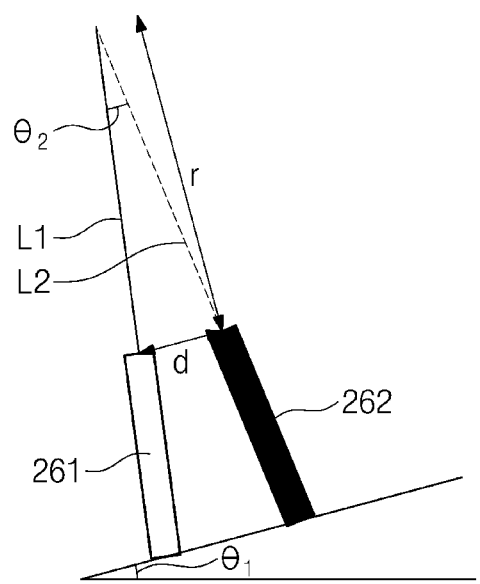
FIG. 11 is a diagram illustrating a method for determining accuracy of mapping between segments.

FIG. 11 is a diagram illustrating a method for determining accuracy of mapping between segments. Referring to FIGS. 6, 10, and 11, a driver assistance system 200 may include a first beam generator 261 and a second beam generator 262. The first beam generator 261 may radiate a first laser beam L1 of a first pattern to a first segment. The second beam generator 262 may radiate a second laser beam L2 of a second pattern to the first selection segment. The first laser beam L1 may differ in wavelength from the second laser beam L2.

The first beam generator 261 and the second beam generator 262 may radiate the first laser beam L1 and the second laser beam L2 under control of a laser controller 250. The laser controller 250 may control the first beam generator 261 and the second beam generator 262 to radiate the first laser beam L1 and the second laser beam L2 toward the center of the first selection segment.

The driver assistance system 200 may obtain distance information and inclined angle information about the first beam generator 261 and the second beam generator 262. A beam generator 260 including the first beam generator 261 and the second beam generator 262 may be inclined by a first angle $\theta_1$ as a whole with respect to a position of a target object. For example, the laser controller 250 may control the beam generator 260 to be inclined by the first angle $\theta_1$ with respect to an x-axis direction and radiate a laser beam. The x-axis direction may be direction of the full width of a vehicle 10.

The first angle $\theta_1$ may be determined on the basis of information about the first selection segment. The information about the first selection segment may include information about azimuth angle to the center of the first selection segment with respect to a traveling direction of the vehicle 10. Because the target object is located at the center of the first selection segment, the azimuth angle to the center of the first selection segment with respect to the traveling direction of the vehicle 10 may be the same as an azimuth angle θt to the target object with respect to the traveling direction of the vehicle 10.

Thus, the driver assistance system 200 may determine a magnitude of the first angle $\theta_1$ to be the same as a magnitude of the azimuth angle θt to the target object with respect to the traveling direction. A sign of the first angle $\theta_1$ may be a minus (−) when the target object is on the left with respect to the traveling direction and may be a plus (+) when the target object is on the right with respect to the traveling direction. The sign of the first angle $\theta_1$ may vary with a sign of the set azimuth angle.

The driver assistance system 200 may calculate a distance r from the first beam generator 261 or the second beam generator 262 to a point where the first laser beam L1 and the second laser beam L2 are overlapped with each other, based on the distance d and the second angle $\theta_2$ between the first beam generator 261 and the second beam generator 262. The distance d and the second angle $\theta_2$ between the first beam generator 261 and the second beam generator 262 may be values determined when the first beam generator 261 and the second beam generator 262 are mounted on the vehicle 10. Because the distance d and the second angle $\theta_2$ between the first beam generator 261 and the second beam generator 262 are the similar to a distance d and an inclined angle θ of a first beam generator 161 and the second beam generator 162 of FIG. 4, a detailed description thereof will be omitted.

The driver assistance system 200 may calculate the distance r from the first beam generator 261 to the point where the first laser beam L1 and the second laser beam L2 are overlapped, by means of Equation 1 below.

$$r = \frac{d}{2\tan\left(\frac{\theta_2}{2}\right)} \qquad \text{[Equation 1]}$$

Herein, r denotes the distance from the first beam generator 261 to the point where the first laser beam L1 and the second laser beam L2 are overlapped with each other, d denotes the distance between the first beam generator 261 and the second beam generator 262, and 02 denotes an inclined angle between the first beam generator 261 and the second beam generator 262.

The driver assistance system 200 may obtain information about a distance from the target object from the information about the first selection segment. The driver assistance system 200 may compare the distance from the target object with the distance r from the first beam generator 261 to the overlapped point, which is calculated by means of Equation 1 above. The driver assistance system 200 may calculate a difference between the distance from the target object and the distance r from the first beam generator 261 to the overlapped point, which is calculated by means of Equation 1 above. When the difference is less than or equal to a threshold, the driver assistance system 200 may complete the mapping between the segments.

According to the present disclosure, the driver assistance system may generate a laser beam depending on a radar and camera operation, thus enhancing the accuracy of detecting an object.

Furthermore, the driver assistance system may control the vehicle based on segment mapping between the radar image and the camera image, thus enhancing driving stability.

The above-mentioned contents are detailed embodiments for executing the present disclosure. The present disclosure may include embodiments capable of being simply changed in design or being easily changed, as well as the above-mentioned embodiments. Furthermore, the present disclosure may also include technologies capable of being easily modified and executed using embodiments. Therefore, the spirit and scope of the present disclosure is defined not by the above-described embodiments, but by those that are identical or equivalent to the claims of the present disclosure as well as the appended claims, which will be described below.

What is claimed is:

1. A driver assistance system, comprising:
    a first processor configured to receive a radar signal from a radar and detect one or more first objects based on the radar signal to determine whether to generate a laser beam;
    a second processor configured to receive a camera signal from a camera and detect one or more second objects based on the camera signal to determine whether to generate the laser beam;
    a laser controller configured to control a beam generator to radiate the laser beam in response to a laser beam generation request signal generated by the first processor or the second processor;
    a segmentation unit configured to extract one or more first segments corresponding to the one or more first objects and one or more second segments corresponding to the one or more second objects, in response to determination to generate the laser beam from the first processor or the second processor;
    a mapping unit configured to map at least one of the first segments and at least one of the second segments;
    a classification unit configured to classify a target object based on an image signal in which the mapping is completed and determine a possibility of collision with the target object; and
    a vehicle controller configured to control a vehicle drive device based on the possibility of collision,
    wherein the first processor is configured to:
    obtain at least one information among signal intensity information, distance information, Doppler information, and azimuth angle information about each of the one or more first objects,
    estimate a radar cross section (RCS) value for each of the one or more first objects based on the at least one information to:
        continue receiving the radar signal, when the RCS value is less than a reference RCS value, and
        estimate a speed of each of the one or more first objects, when the RCS value is greater than or equal to the reference value,
    generate the laser beam generation request signal, when the speed is less than a reference speed, and
    provide the vehicle controller with a first control signal for controlling the vehicle drive device based on the at least one information, when the speed is greater than or equal to the reference speed.

2. The driver assistance system of claim 1, wherein the second processor is configured to:
    process the camera signal to determine a type of each of the one or more second objects, and
    calculate a risk probability of each of the one or more second objects to:
        provide the vehicle controller with a second control signal for controlling the vehicle drive device based on the radar signal, when the risk probability is greater than a first reference probability, and
        compare the risk probability with a second reference probability, when the risk probability is less than or equal to the first reference probability.

3. The driver assistance system of claim 2, wherein the second processor is configured to:
    generate the laser beam generation request signal, when the risk probability is greater than the second reference probability, and
    continue receiving the camera signal, when the risk probability is less than or equal to the second reference probability.

4. The driver assistance system of claim 1, wherein the laser controller is configured to:
    control the beam generator to radiate the laser beam in response to the laser beam generation request signal, and
    provide the second processor with radiation timing information and pattern information of the laser beam.

5. The driver assistance system of claim 4, wherein the second processor is configured to obtain a camera image after the laser beam is radiated based on the radiation timing information and the pattern information of the laser beam.

6. The driver assistance system of claim 1, wherein the segmentation unit includes:
    a first segmentation unit configured to extract the first segments and select a first selection segment in which an intensity of the radar signal is greater than or equal to a certain magnitude among the first segments; and
    a second segmentation unit configured to extract the second segments and select a second selection segment to which the laser beam is radiated among the second segments.

7. The driver assistance system of claim 6, wherein the first processor is configured to obtain position information of the first selection segment, and
    wherein the laser controller is configured to receive the position information of the first selection segment and control the beam generator to radiate the laser beam to the center of the first selection segment.

8. The driver assistance system of claim 7, wherein the mapping unit is configured to perform mapping between the first selection segment and the second selection segment and generate the image signal for the target object included in the first selection segment and the second selection segment.

9. The driver assistance system of claim 8, wherein the classification unit is configured to:

crop a certain portion including the target object from the image signal to classify the target object based on a deep learning algorithm, and determine the possibility of collision with the target object based on classification of the target object, a risk probability of the target object, a distance from the target object, and a relative speed with the target object.

10. The driver assistance system of claim 9, wherein the vehicle controller is configured to:

control the vehicle drive device such that a vehicle avoids the target object to travel, when the possibility of collision is greater than or equal to a reference value, and control the vehicle drive device such that the vehicle maintains a current driving state, when the possibility of collision is less than the reference value.

11. An operation method of a driver assistance system implemented in a vehicle including a radar and a camera, the operation method comprising:

detecting one or more first objects based on a radar signal obtained by the radar to obtain information about the one or more first objects;

detecting one or more second objects based on a camera signal obtained by the camera to obtain information about the one or more second objects;

radiating a laser beam in response to a laser beam generation request signal generated based on the information about the one or more first objects or the information about the one or more second objects;

obtaining camera image information after the laser beam is radiated from the camera signal;

performing segmentation and mapping for the radar signal and the camera image information;

classifying a target object based on an image signal in which the mapping is completed and determining a possibility of collision with the target object; and controlling a vehicle drive device based on the possibility of collision, wherein the detecting of the one or more the first objects includes:

obtaining at least one information among signal intensity information, distance information, Doppler information, and azimuth angle information about each of the one or more first objects;

estimating a radar cross section (RCS) value for each of the one or more first objects based on the at least one information;

continuing receiving the radar signal, when the RCS value is less than a reference RCS value;

estimating a speed of each of the one or more first objects, when the RCS value is greater than or equal to the reference value;

generating the laser beam generation request signal, when the speed is less than a reference speed; and providing the vehicle controller with a first control signal for controlling the vehicle drive device based on the at least one information, when the speed is greater than or equal to the reference speed.

12. The operation method of claim 11, wherein the performing of the segmentation and the mapping includes:

extracting one or more first segments from the radar signal;

determining a first selection segment in which an intensity of the radar signal is greater than or equal to a certain magnitude among the one or more first segments;

radiating the laser beam to the center of the first selection segment;

extracting one or more second segments from the camera signal;

determining a second selection segment to which the laser beam is radiated among the one or more second segments; and mapping the first selection segment and the second selection segment.

* * * * *